Oct. 18, 1938.   L. S. WILLIAMS   2,133,763
FORCE MEASURING INSTRUMENT
Filed Aug. 27, 1937
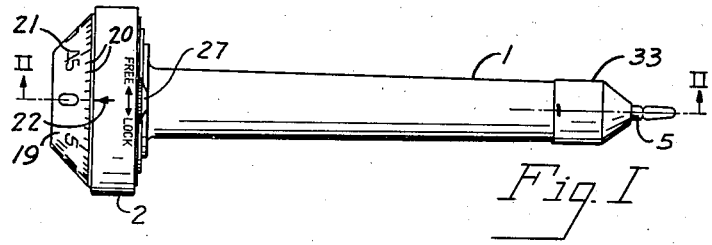
Fig. I
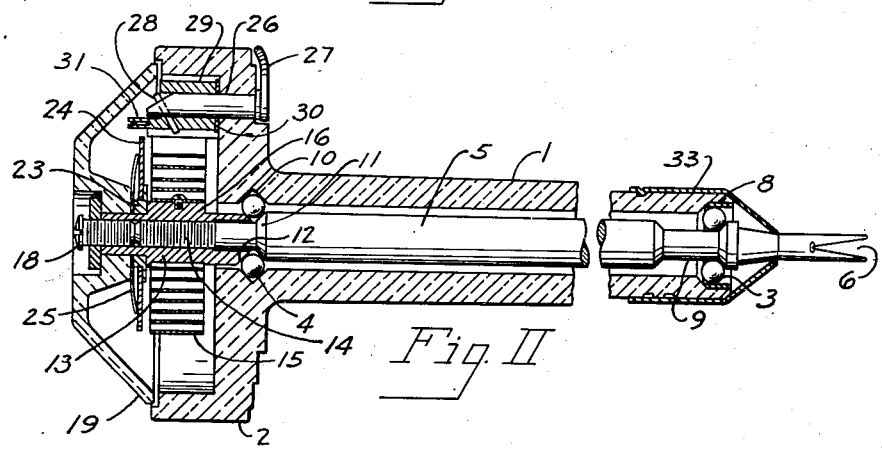
Fig. II
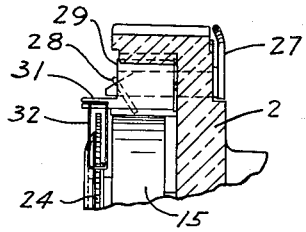
Fig. IV
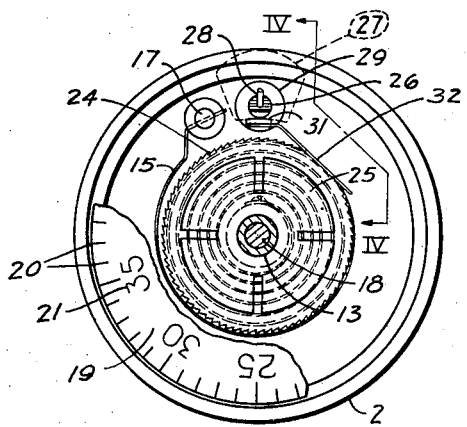
Fig. III
Lawrence S. Williams
INVENTOR
BY Marshall & Marshall
ATTORNEYS Patented Oct. 18, 1938

2,133,763

UNITED STATES PATENT OFFICE 2,133,763

FORCE MEASURING INSTRUMENT

Lawrence S. Williams, Toledo, Ohio, assignor to Toledo Scale Manufacturing Company, Toledo, Ohio, a corporation of New Jersey Application August 27, 1937, Serial No. 161,273

3 Claims. (Cl. 265—1)

This invention relates to force measuring instruments of the type described and illustrated in my U. S. Patent No. 2,013,938. In using the instrument illustrated in the said patent, when a thread that is connected to the device yields or breaks, the indicator recedes from the position at which it indicated the maximum force. The maximum force may have been attained only momentarily and if the operator's attention were not focused upon the indicator at the moment of attainment of maximum force, he would fail to note the maximum reading. In the hands of inexperienced operators the indicator of the device described and illustrated in the said patent is sometimes violently twisted, and such violent twisting is liable to injure the instrument. It is an object of this invention to provide means for retaining such indicators in positions indicative of the maximum forces tested.

Another object of the invention is to provide means for rendering the indicator retaining device operative, or inoperative, at will.

Another object is to provide means for preventing injury to the instrument in case the indicator is violently twisted either when the retaining device is in locking position or when it is not in locking position.

And still another object is the provision of means whereby the indicator can be easily and quickly reset in zero position.

Other objects and advantages will be apparent from the following description, in which reference is had to the accompanying drawing illustrating a preferred embodiment of my invention and wherein similar reference numerals designate similar parts throughout the several views.

In the drawing:—

Figure I is an elevational view of a force measuring instrument embodying my invention.

Figure II is an enlarged sectional view taken substantially on the line II—II of Figure I, the central rotatable shaft being shown in elevation, and a part being broken out for the purpose of shortening the figure.

Figure III is an end elevational view taken from a position at the left side of Figure II, the greater part of the indicator chart being broken away and a part of the chart fastening bushing and screw being shown in section.

Figure IV is a fragmentary sectional view taken substantially on the line IV—IV of Figure III.

Referring to the drawing in detail, the body of the device consists of a barrel 1, upon one end of which is formed a casing 2, the barrel and casing preferably being integrally formed of light, durable material such as synthetic resin. In an embodiment of my device intended for measuring small forces such as the tension of thread in sewing machines, the reactive force exerted by small springs and small frictional resistances the barrel is comparable in size to that of a large fountain pen and constitutes a handle, while the casing is comparable in size to that of a large watch.

Rotatably mounted in ball bearings 3 and 4 within the barrel 1 is a shaft 5, having one end formed, as illustrated in Figure II, with an end notch 6. The ball bearing 3, which is subjected to radial load when the device is in use, is equipped with a metallic outer ball race 8, the inner race being formed by a reduced portion 9 of the shaft 5. The outer race of the ball bearing 4 is formed by an annular V-shaped groove 10 cut into the interior of the barrel 1, the inner race being formed by a beveled shoulder 11 on the shaft 5 and the beveled end 12 of a sleeve 13 which is threaded onto a reduced end 14 of the shaft 5. The thrust and radial loads to which the bearing 4 is subjected are very slight; hence, no hardened race is needed for this bearing. In the operation of the device, the end of a thread is caught in the notch 6 and the thread is then wound around the adjacent portion of the shaft 5; and when the instrument is used for testing small forces such as the resistance of small springs to distortion or small friction resistances a yieldable resistance to the pull upon the thread is provided by a flat spiral spring 15, the inner end of which is anchored to a projection 16 on the sleeve 13, while the other end is anchored to a pin 17 secured within the casing 2. The sleeve 13 is locked to the shaft 5 by means of a locking screw 18.

Mounted upon the sleeve 13 and fixedly secured thereto is a dial 19, also made of light, durable material such as synthetic resin. The dial 19 is provided with graduations 20 and numerals 21, which cooperate with an index 22 on the casing 2 to indicate pull upon a thread connected to the shaft 5.

Mounted upon the sleeve 13 is a shouldered washer 23 and rotatably mounted upon the washer 23 is a ratchet disk 24 which is pressed against the shoulder of the washer 23 by a saucer-shaped spring 25, the other side of the spring being pressed against an abutment on the rear face of the dial 19. The stiffness of the saucer-shaped spring 25 is sufficient to prevent the ratchet disk 24 from rotating upon the shouldered washer 23 unless the force tending to rotate the disk relatively to the washer is greater than the force exerted by the spiral spring 15 under maximum load.

Rockingly mounted in an opening in the casing 2 is a rockshaft 26, having a fingerpiece 27 formed upon its outer end. Fastened, by means of a pin 28, upon the inner end of the rockshaft 26 is a collar 29, and interposed between the collar 29 and the inner side of the casing 2 is a spring washer 30 which serves to prevent the shaft 26 from rocking unless it is purposely rocked by means of the fingerpiece 27. Fastened to a projection 31 on the collar 29 are the ends of a loop 32 of fine wire. The wire 32 is held out of engagement with the moving parts of the instrument when the fingerpiece is in the position marked "Free" (see Figure I), but when the fingerpiece is turned to the position marked "Locked" (see Figure I), the bight of the fine wire loop rides over the teeth of the ratchet disk 24 as the shaft is turned and the spring 15 is wound up under load. When the force which tends to turn the shaft 5 is lessened or released, one of the ratchet teeth is caught by the bight of the light wire loop 32, and the indicator, which is prevented from turning relative to the ratchet disk by the frictional engagement of the spring 25 with the ratchet disk, is held in the position in which it indicated the maximum load applied to the shaft 5.

The dial 19 can be turned manually with respect to the ratchet disk 24, since the pressure of the saucer-shaped spring is not sufficient to prevent manual turning of the dial 19 even though the ratchet disk be held against such turning by engagement of one of the teeth with the wire loop 32. Hence the dial can be reset to zero position, or turned back to any desired extent from the position in which it indicates the last maximum load applied to the shaft 5, without turning the fingerpiece 27 to "Free" position. It is preferable to return the dial nearly to zero position before turning the fingerpiece to "Free" position, and the fact that the dial can slip relative to the ratchet disk 24 under manual turning prevents injury to the mechanism from careless or uninformed handling.

A ferrule 33 forced over the end of the barrel 1 serves to exclude dirt from the ball bearing 3 and to give the device a finished appearance.

In using the device, the notch 6 is thrust over the thread so that the thread is straddled by the furcation formed by the notch. The entire instrument is then turned to the right to wind the thread about the end of the shaft, and the instrument, tightly held with its case perpendicular to the direction of extension of the thread, is bodily moved in a direction to exert a pull upon the thread. The thread may pass through friction applying devices, or may be attached to a spring or other force resisting or exerting agency to be tested, and the pull of the thread, acting upon the periphery of the shaft extension, rotates the shaft against the resistance of the spiral spring 15. The dial 19, which is so mounted as to rotate with the shaft 5, turns to a position in which the pull upon the thread is indicated by the condition of registration of the graduations and numerals of the dial with the index 22 on the non-rotating casing 2. If, for example, the strength of an element is being tested, the amount of resistance to pull exerted by the element before it yields or breaks will be indicated by the cooperating dial and index.

If before the test the fingerpiece 27 has been turned to "Locked" position, the dial will not return toward zero when the force exerted upon the shaft 5 is lessened or ceases, as will happen if an element being tested yields or breaks, but will remain in the position indicative of the maximum load. If a series of tests is to be made under similar conditions, it is unnecessary to return the dial to zero position or to release the retaining device, but after each test the dial may be turned to a position back of the next expected maximum indication. When the fingerpiece 27 is turned to "Free" position the dial will return to zero of its own accord, and, since by turning it manually the dial can be slipped relatively to the ratchet disk 24, it may be manually returned to zero without turning the fingerpiece 27 to "Free" position. The dial being permanently fixed with respect to the shaft 12 and the anchorage of the inner end of the spiral spring 15, the spring 15 will always be relieved of tension when the dial is in zero position.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, an elongated rotatable shaft, means at one end of said shaft for fastening a line thereto whereby a pull on said line will exert a turning effort on said shaft, an anti-friction bearing adapted for taking only radial load adjacent said end of said shaft, torsionally acting means for yieldably resisting such turning effort, a bearing adapted for taking radial and thrust loads supporting said shaft adjacent such torsionally acting means, means for indicating the amount of such turning effort, and means for releasably retaining such indicating means for maximum load position, said retaining means including a ratchet disk and means for frictionally connecting said ratchet disk to said indicator.

2. In a device of the class described, in combination, an elongated rotatable shaft, means at one end of said shaft for fastening a line thereto whereby a pull on said line will exert a turning effort on said shaft, an anti-friction bearing adapted for taking only radial loads adjacent said end of said shaft, torsionally acting means for yieldably resisting such turning effort, a bearing adapted for taking radial and thrust loads supporting said shaft adjacent such torsionally acting means, means for indicating the amount of such turning effort, means for releasably retaining such indicating means for maximum load position, said retaining means including a ratchet disk and means for frictionally connecting said ratchet disk to said indicator, and a light wire loop having a bight engageable with the teeth of said ratchet disk.

3. In a device of the class described, in combination, force receiving means, force counterbalancing means operatively connected to said force receiving means, force indicating means secured to said force receiving means, a member having ratchet teeth, a wire loop having a bight engageable with said ratchet teeth to ride over them when said member is moved in one direction and to prevent movement of said member in the opposite direction, and means frictionally connecting said member to said force indicating and force receiving means whereby said force indicating and force receiving means can be moved manually while said member is prevented from movement by engagement of the bight of said loop with one of its ratchet teeth.

LAWRENCE S. WILLIAMS.